March 5, 1946.  H. KERSHAW  2,395,970
APPARATUS FOR EXPOSING AND DEVELOPING FILMS
Filed March 31, 1944  5 Sheets-Sheet 1
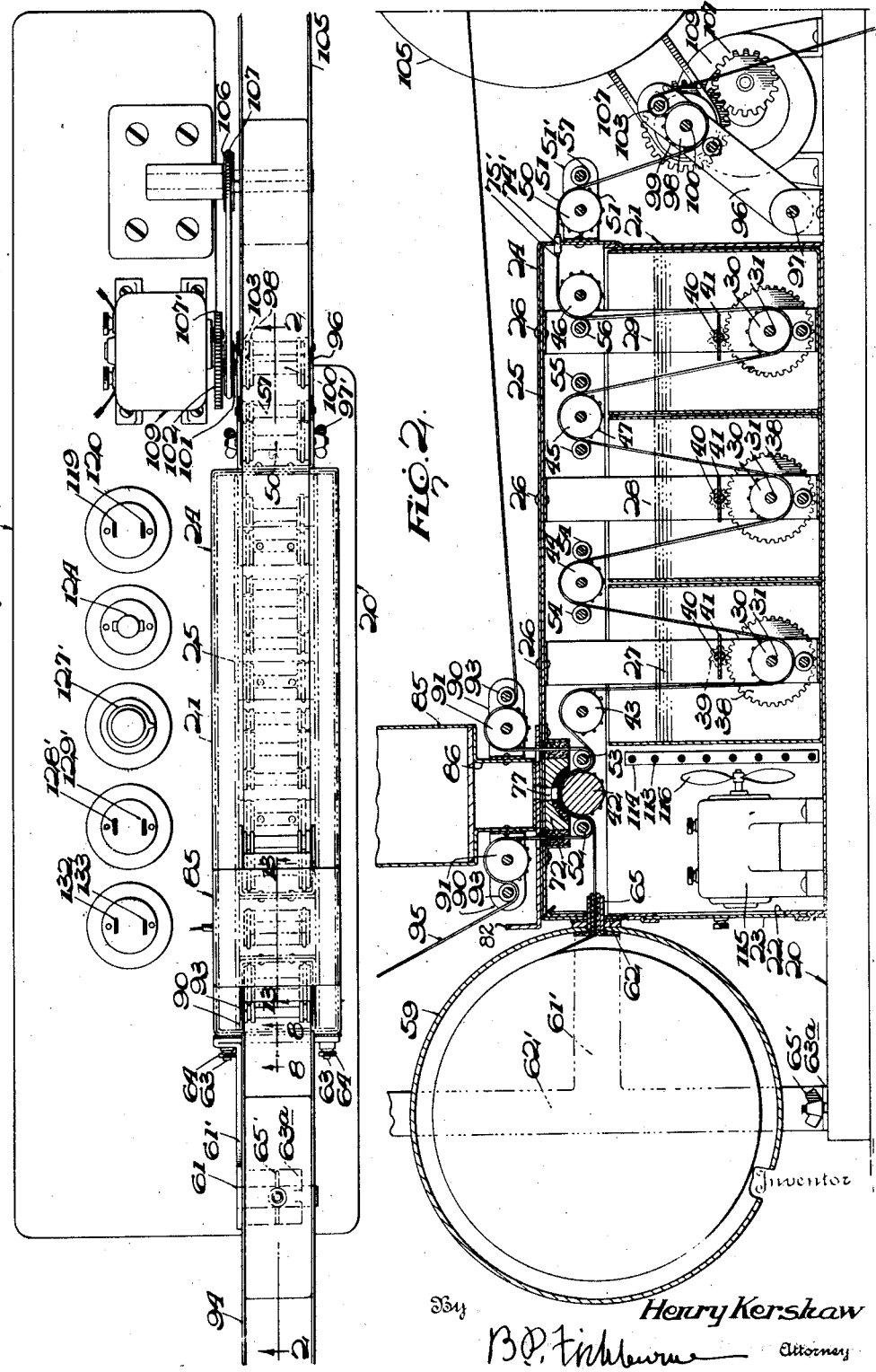

March 5, 1946. H. KERSHAW 2,395,970
APPARATUS FOR EXPOSING AND DEVELOPING FILMS
Filed March 31, 1944 5 Sheets-Sheet 2
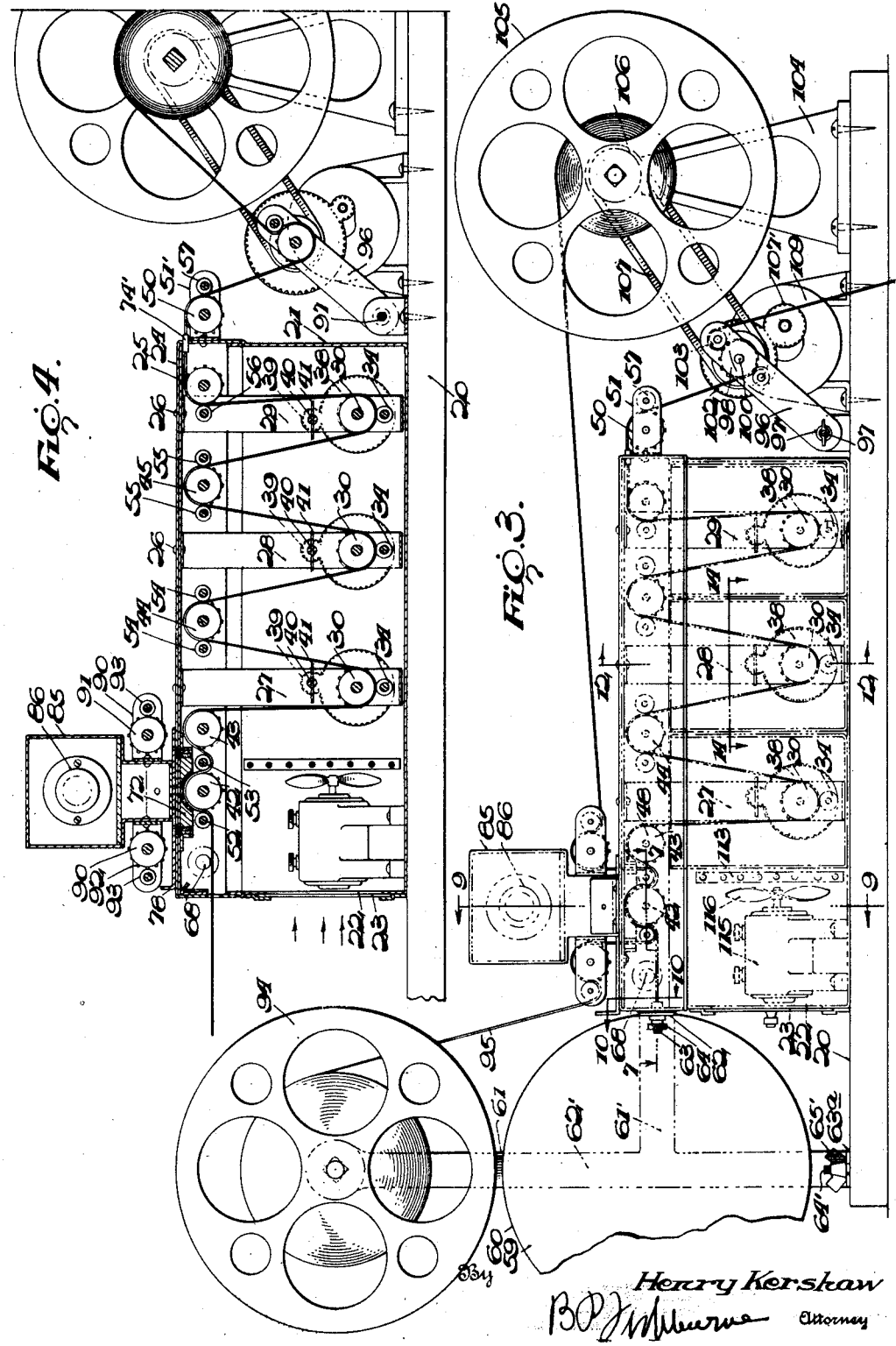

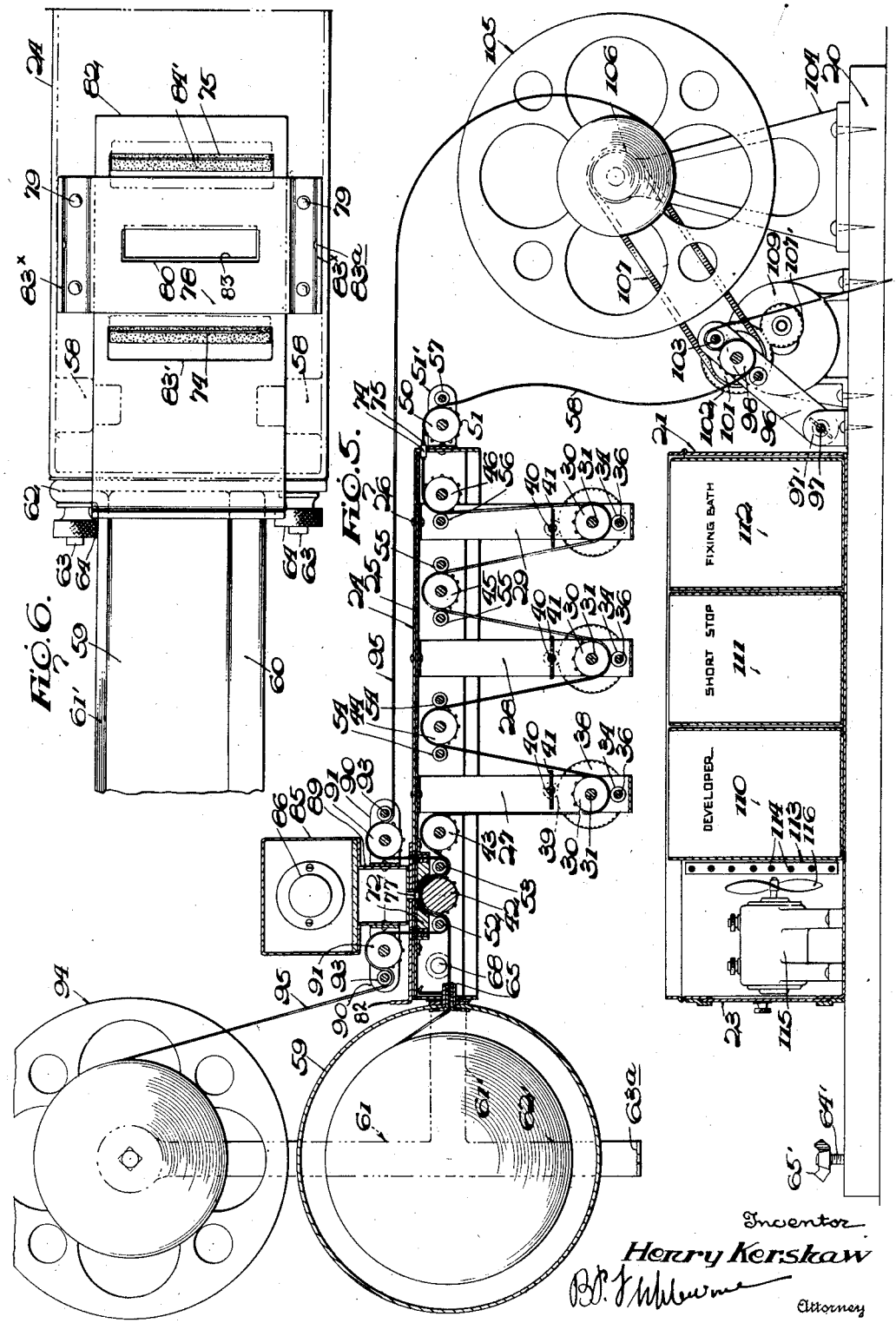

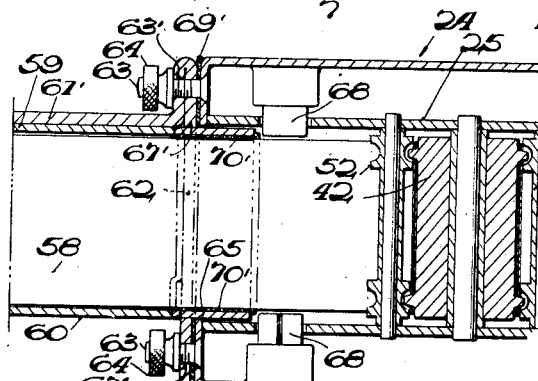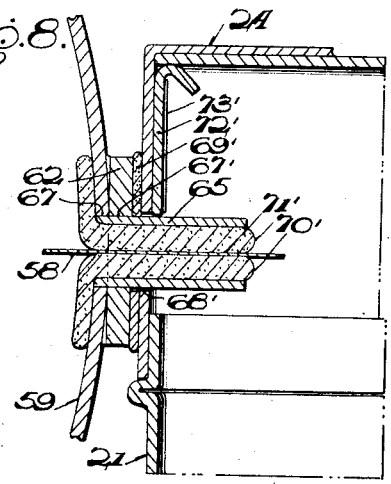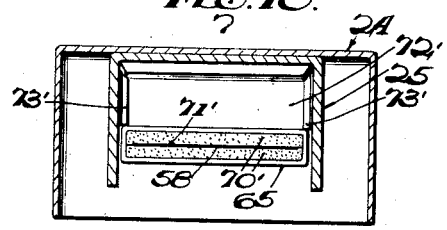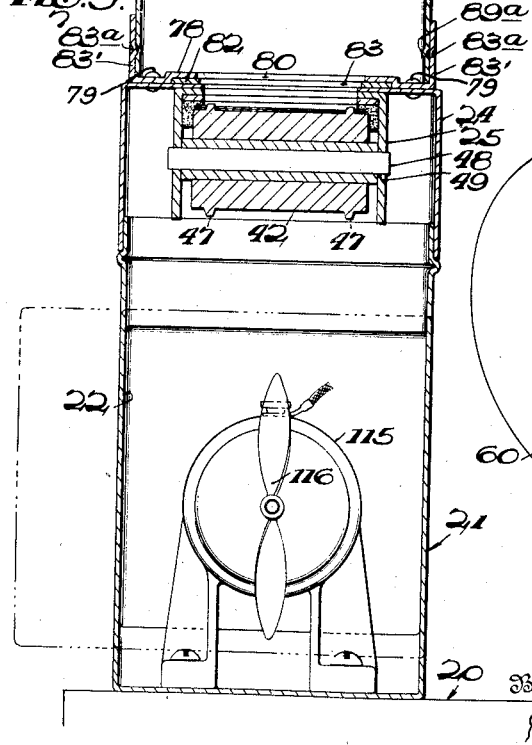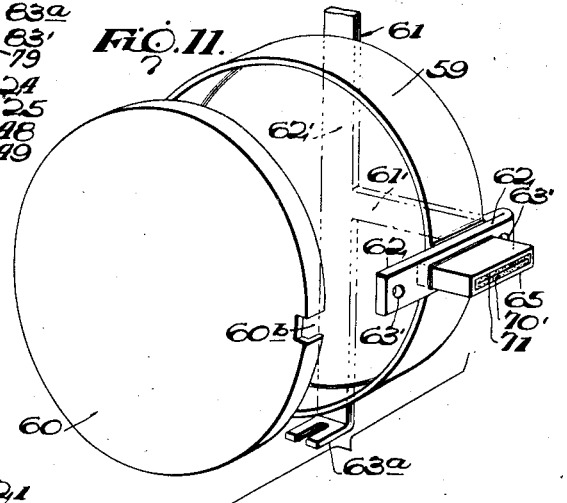

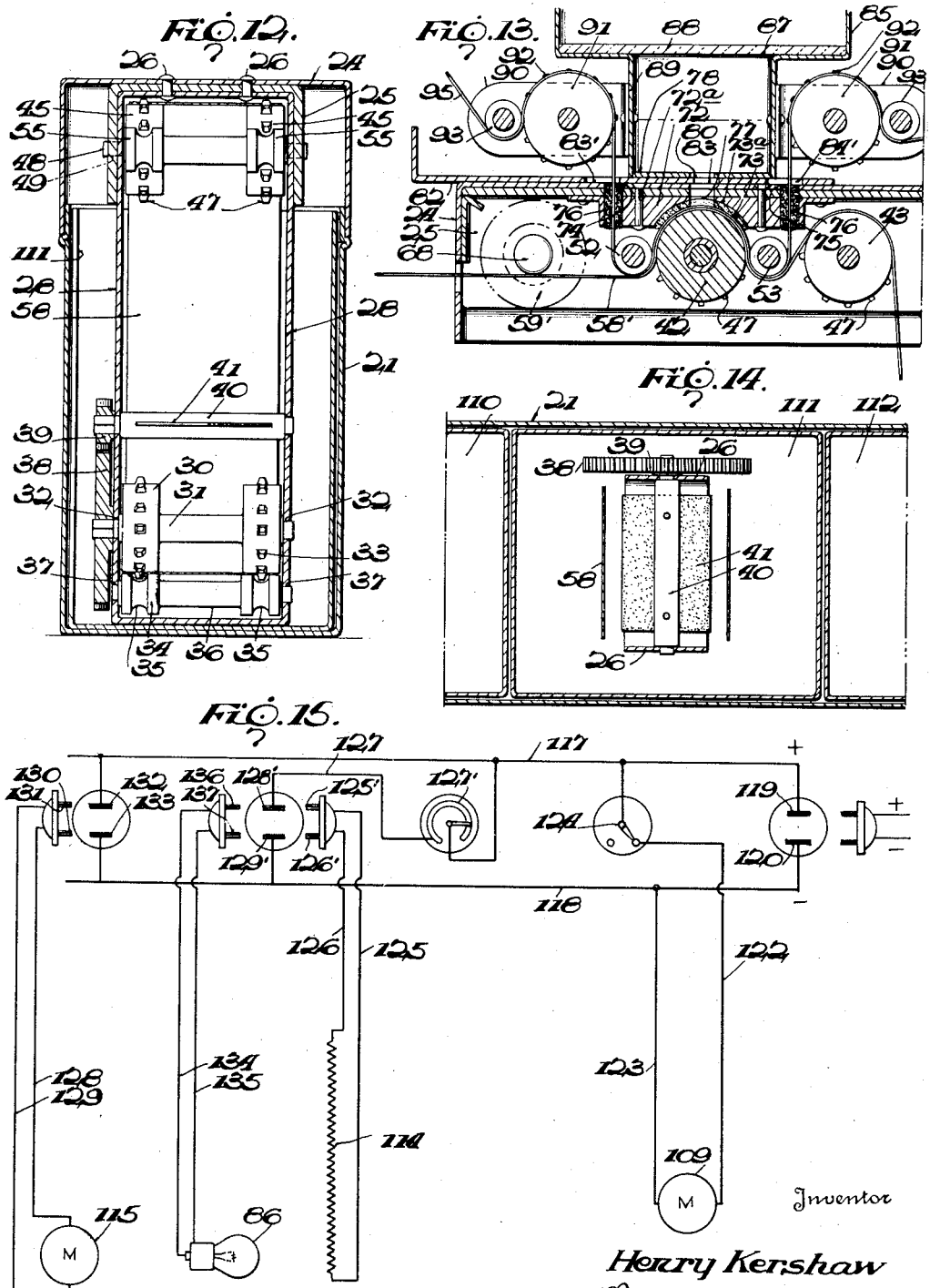

Patented Mar. 5, 1946

2,395,970

UNITED STATES PATENT OFFICE 2,395,970

APPARATUS FOR EXPOSING AND DEVELOPING FILMS

Henry Kershaw, Belleville, N. J.

Application March 31, 1944, Serial No. 528,975

10 Claims. (Cl. 95—75)

My invention relates to photographic apparatus for developing, copying or drying films.

An important object of the invention is to provide apparatus of the above mentioned character whereby the exposed film may be developed, where the ordinary dark room is not available.

A further object of the invention is to provide apparatus which is cheap, compact and will save space.

A further object of my invention is to provide apparatus of the above mentioned character, the operating parts of which are mounted upon the cover of the casing and are removable as a unit with the cover to render them readily accessible.

A further object of the invention is to provide apparatus of the above mentioned character which may be employed to develop an exposed film, or may be employed to copy a film and develop the resultant exposed film.

A further object of the invention is to provide apparatus of the above mentioned character, to expose the unexposed film for copying purposes.

A further object of the invention is to provide means to draw the film through the apparatus at a suitable speed for developing, and at a slower speed for drying.

A further object of the invention is to provide apparatus which may employ long or short lengths of exposed films to be developed.

A further object of the invention is to provide apparatus of the above mentioned character which may be used as a drier for the developed film after washing.

Other objects and advantages of the invention will be apparent during the course of the following description.

In the accompanying drawings forming a part of this application and in which like numerals are employed to designate like parts throughout the same, Figure 1 is a plan view of apparatus embodying my invention, Figure 2 is a longitudinal section, upon an enlarged scale, taken on line 2—2 of Figure 1, Figure 3 is a side elevation of the apparatus, Figure 4 is a central vertical longitudinal section through the casing, the tanks being removed, and the apparatus used as a drier, Figure 5 is a central vertical longitudinal section through the apparatus, as shown in Figures 1 to 3 inclusive, the cover for the casing being removed, Figure 6 is a plan view of the cover and associated elements, parts being broken away, Figure 7 is a horizontal section taken on line 7—7 of Figure 3, Figure 8 is a vertical section taken on line 8—8 of Figure 1, Figure 9 is a transverse vertical section taken on line 9—9 of Figure 3, Figure 10 is a vertical transverse section taken on line 10—10 of Figure 3, Figure 11 is a perspective view of the light-tight film case and associated elements, Figure 12 is a transverse vertical section taken on line 12—12 of Figure 3, Figure 13 is a longitudinal section taken on line 13—13 of Figure 1, Figure 14 is a horizontal section taken on line 14—14 of Figure 3, Figure 15 is a diagrammatic view of the circuits included in the apparatus.

In the drawings, wherein for the purpose of illustration is shown a preferred embodiment of my invention, the numeral 20 designates a horizontal base, upon which is mounted a casing or housing 21, open at its top. At one end, the casing 21 has an opening 22, for the entrance of air, and this opening is adapted to be covered by a slide-door 23, forming a light-tight joint with the casing 21.

The casing 21 has a cover 24, adapted to telescope with the open top the casing, and forms a light-tight joint therewith.

Arranged within the cover 24 is a channel 25, extending throughout the entire length of the cover, spaced from its sides, and attached to the top of the cover by rivets 26 or the like. The numerals 27, 28 and 29 designate vertical loops or brackets, depending from the channel 25. The upper ends of these loops extend into the channel 25 and are attached to the top of the channel and the top of the cover 24 by the rivets 26, as shown. These loops or brackets are therefore permanently attached to the cover and are removable with it as a unit. Each loop or bracket has a film guide spool 30 mounted in its lower end and having a hub 31, rotatable in openings 32 formed in the sides of the loop or bracket. The spool 30 has teeth or projections 33 to enter the usual perforations at the longitudinal edges of the film. Arranged near and beneath each guide spool 30 is a coating guide spool 34, having grooves 35, to receive the teeth 33. The guide spool 34 has a hub 36 rotatable within openings 37 formed in the sides of the loop or bracket 27. The spool 34 prevents the teeth 33 from moving out of the perforations of the film. The hub 31 has a large gear 38, rigidly secured thereon, and this large gear engages a small gear 39, rigidly mounted upon a shaft 40, rotatable within openings formed in the sides of the loop or bracket, and having an agitator 41 rigidly mounted thereon. Rotatably mounted within the channel 25 are spools 42, 43, 44, 45 and 46, each of which has teeth 47 to enter the perforations of the films. Each spool has a hub or shaft 48, rotatable within openings 49 formed in the sides of the channel 25 as shown.

A spool 50, having teeth 51, is mounted at the outlet end of the cover 24 and is carried by arms or brackets 51', secured to the cover, as shown. The numerals 52 and 53 designate grooved spools, rotatably mounted within and upon the channel 25 and disposed near and upon opposite sides of the spool 42 and the grooved spool 53 is arranged between the spools 42 and 43. The grooved spools 52 and 53 are of smaller diameter than the spool 42 and have their axes of rotation in alignment with the axis of rotation of the spool 42 and all of these axes are in the same horizontal plane. It is thus seen that the spools 52 and 53 will serve to guide the film or films over substantially the upper half of the spool 42. The spool 42 is solid. Grooved pulleys 54 are disposed near and upon opposite sides of the spool 44 and mounted within and upon the channel 25. Grooved spools 55 are mounted upon the opposite sides of the spool 45 and are mounted within and upon the channel 25. A grooved spool 56 is disposed near and upon the inner side of the spool 46 and is mounted within and upon the channel 25. A grooved spool 57 is disposed near and upon one side of the spool 50 and is mounted upon and between the brackets 51.

The numeral 58 designates a film and this film passes beneath spool 52, over spool 42, beneath spool 53, over spool 43, beneath spool 30 of loop 27, over spool 44, beneath spool 30 of loop 28, over spool 45, beneath spool 30 of loop 29, over spool 46 and over spool 50. From spool 50, the film 58 passes through the washing tank. The film 58 is fed from a light-tight cylindrical case 59. Within the case 59, the film 58 would be unexposed, if it is used for copying purposes, as shown. The case 59 has a removable cover 60. The case 59 is rigidly secured to a T-shaped bracket 61, by welding or the like, having horizontal and vertical arms 61' and 62'. The horizontal arm 61' is bent into a transverse strip 62, having apertures 63', for receiving bolts 63, rigidly secured to the intake end of the cover 24. These bolts carry nuts 64. At its lower end, the vertical arm 62' has a horizontal slotted foot 63ª to receive a bolt 64', rigidly secured to the base 20 and carrying a nut 65'. The bracket 61 is therefore rigidly and detachably secured to the cover 24 and to the base 20, and may be removed as a unit with the cover 24, and may also be separated from the cover, when desired. The case 59 is provided with a tube 65, which has a light-tight connection therewith. The case 59 has an opening 67, to receive the tube 65, and the tube is rigidly secured to the case by any suitable means, such as by soldering. The tube 65 extends through an opening 67' formed in the horizontal extension 62 and also extends through an opening 68' formed in the end of the cover 24. The tube 65 forms a light-tight joint with these parts and if desired, compressible packing 69' may be used to closely fit the tube 65. The cover 60 has a notch 60ᵇ to receive one edge of the tube 65 and forms a light-tight joint therewith, which is aided by the felt packing 70'. Any other suitable means may be employed to effect this light-tight joint. The tube 65 receives compressible packing 70', which may be felt, providing a slit 71' for the passage of the film. When the light tight case 59 is separated from the cover 24, the tube 65 is withdrawn from within the opening 68', and this opening is then covered by a slide 72', operating within guides 73'. The slide 72' forms a light-tight joint with the end of the cover. It is thus seen that the unexposed film within the case 59 may be passed through the slit 71' and into the casing 21, which is light-tight when the cover 24 is applied thereto, and this film may be exposed within the casing 21, for the purpose of copying, and then developed within the casing 21, and subsequently discharged from the casing 21 through a tube 74'. This tube is rigidly secured to the cover 24 and forms a light-tight joint therewith. The tube 74' is lined with felt 75', providing a slit for the passage of the film and forming a light-tight joint with the film, the slit closing when the film is removed. If desired, separate means may be employed to cover the tube 74'.

Arranged within the end of the cover 24, next to the case 59, are spring pins 68, to hold a 36 mm. film cartridge. When this film cartridge is used, the film is not withdrawn from the case 59, and the case may be separated from the cover 24. The film from the cartridge is then passed about the several spools, in place of the film 58.

The apparatus may be used to copy a film, as will be more fully explained, and for this purpose a block or bridge 72 is arranged within the channel 25, over the solid spool 42. This block is attached to the channel by rivets 72ª. The block or bridge 72 has a lower curved recess 73ª, which is lined with felt 73, to engage with the film passing over the spool 42 and forms a light-tight joint therewith. The top of the cover 24 has slots 74 and 75, upon opposite sides of the spool 42, and these slots are lined with felt 76, in a similar manner to the felt lining 70' of the tube 65. The block 72 has a main light passage 77, extending through the top of the cover 24, the channel 25 and the felt lining 73, so that the light may pass to the film 58 to be exposed, while passing across the passage 77, but the light cannot escape from the edges of the passage.

The numeral 78 designates an outer guide or plate arranged upon the top of the cover 24, spaced therefrom, and secured thereto by rivets 79. This guide has an opening 80, in alignment with the opening or passage 77. The numeral 82 designates a slide or plate-valve having a transverse opening 83 and transverse openings 83' and 84'. The slide 82 is shifted longitudinally to regulate the width of the opening 80 or passage 77, which may be closed in whole or in part by the slide 82, for regulating the intensity of the light supplied to the unexposed film. The openings 83' and 84' are wider than the opening 80, and the slide 82 may cover the passage 77, in whole or in part, while the slots 74 and 75 remain uncovered. Further inward movement of the slide 82 after it has covered the passage 77, will cause the same to cover the slots 74 and 75. The guide 78 is provided with vertical webs 83ˣ, at its ends, having studs 83ª. These webs may be somewhat resilient.

The numeral 85 designates a light box, having a source of light 86 therein and having an opening 87 in its bottom, covered by ground glass 88. The opening 87 communicates with a tubular extension 89, which is rectangular and is adapted to be inserted upon the guide 78, between the webs 83, and has depressions 89ª to receive the studs 83ª. The extension 89 is held in place by frictional engagement with the web 83ˣ and by means of the studs 83ª and associate elements, although any other suitable means may be employed. When the slide 82 is in the outer position the opening 80 and passage 77 are uncovered so that light may pass through the passage 77 to the films passing over the top of the spool 42, and the slots 74 and 75 are also uncovered for the passage of the processed film, to be described. Rigidly secured to the opposite ends of the tubular extension 89 are brackets 90, having spools 91 arranged between them and rotatably mounted thereon. These spools have teeth 92 to enter the perforations of the film. Coacting groove spools 93 are rotatably mounted between and upon the brackets 90 outwardly of and adjacent to the spools 91.

The vertical arm 62' of the T-shaped bracket 61 supports a reel 94 for paying out a positive processed film 95 to be copied. This film is passed beneath the spool 93 to the left, over the spool 91 to the left, beneath the spool 52 to the left, over film 58 and spool 42, beneath spool 53, then up through slot 75 to the spool 91 to the right and then to the winding mechanism, to be described.

The rewinding mechanism is arranged adjacent to the discharge end of the cover 24 and this mechanism includes a vertically swinging support including spaced arms 96, pivoted upon a fixed pivot 97, and adapted to be clamped in the selected adjusted position by thumbnuts 97'. Arranged between the upper or free ends of the arms 96 is a spool 98, having teeth 99 to enter the perforations of the film 58.

The spool 98 is rigidly mounted upon a shaft 100, rotatably mounted within openings formed in the arms 96, and this shaft 100 has a grooved pulley 101 rigidly mounted thereon, exteriorly of the adjacent arm 96, and a gear 102 is also rigidly and removably mounted upon the shaft 100 so that another gear of a larger size may be substituted therefor when desired. A grooved spool 103 is arranged between and mounted upon the arms 96 for coaction with the spool 98. The numeral 104 designates a vertical support, holding a rotatable reel 105, upon which the film 95 is to be wound. The film 58 passes from the spool 50 and extends beneath the spool 98 and over the spool 103 and then downwardly to the washing tank. The reel 105 is driven by a grooved pulley 106, engaging a spring belt 107, also engaging the pulley 101. The gear 102 engages a small gear 107', driven by a motor 109.

Removably mounted within the casing 21 is a "Developer" tank 110, a "Short-stop" tank 111 and a "Fixing bath" tank 112. These tanks are arranged to receive the loops or brackets 27, 28 and 29, as shown.

The numeral 113 designates an electrical heater, of the resistance type, adapted to generate heat at approximately 80° F. This heater includes coils 114 which are disposed in spaced superposed horizontal relation and extend over the entire cross sectional area of the casing 21. Arranged between the slides 23 and the heater 113, within the casing 21, is a motor 115, driving a fan 116.

The numerals 117 and 118 designate lead wires, connected with terminals 119 and 120 of a feed socket, and these terminals are to be connected with the opposite poles of a source of current. A lead wire 122 is connected with one pole of the motor 109 and with the wire 117, and a wire 123 is connected with the opposite pole of the motor 109 and the wire 118, and a switch 124 is connected in the wire 122.

The resistance coil 114 has one terminal connected with a wire 125, connected with the terminal 125' of a plug. The opposite terminal of the coil 114 is connected with a wire 126, connected with a terminal 126' of the plug. A wire 127 is connected across the wires 117 and 118 and has a rheostat 127' connected therein and the terminals 128' and 129' of a socket also are connected therein. The terminals 125' and 126' of the plug are adapted to engage the terminals 128' and 129'. The motor 115 has one terminal connected with a wire 128, and its opposite terminal connected with a wire 129, the wires 128 and 129 are connected with terminals 130 and 131 of a plug, and these terminals are adapted for connection with terminals 132 and 133 of a socket, and the terminals 132 and 133 are connected with wires 117 and 118. It is thus seen that the terminals 130 and 131 may be plugged in to connect the motor 115 with the wires 117 and 118 and the motor circuit is open when the terminals 130 and 131 are withdrawn from the socket. If desired a separate switch may be arranged in either wire 128 or 129. The lamp 86 has its terminals connected with wires 134 and 135, connected with terminals 136 and 137, which are plugged in to engage the terminals 128' and 129' when the circuit for the coil 114 is open. It is thus seen that the rheostat 127' may control the coil 114 or the lamp 86.

The operation of the apparatus is as follows:

The apparatus will be described as used to copy a positive processed film, and to develop the exposed negative film used in the copying. The cover 24 is arranged upon the casing 21 and forms a light-tight joint therewith. The loops 27, 28 and 29 extend into the tanks 110, 111 and 112 respectively, and the exposed portion of the film 58 will pass through these tanks in succession, and be acted upon by the "Developer" solution, the "Short-stop" solution and "Fixing-bath." The film 58 is withdrawn from the case 59 and passes over the top of the solid spool 42, and is unexposed until it travels across the light opening or passage 77. The positive processed film 95 also passes over the solid spool 42 and over the film 58. Since the film 95 is light transmitting the light will pass through the same to the film 58 so that the film 58 will copy the film 95. The two films 58 and 95 therefore travel continuously over the top of the solid spool 42, and the upper film 95 firmly engages the felt lining 73, so that no light can escape at the edges of the opening 77. These films are held against relative movement by the teeth 47 and also by the fact that they firmly engage each other while passing over the solid spool 42. This firm engagement is effected by the fact that the upper film 95 engaging upon the lower film 58 travels about a circumference having a slightly greater diameter and is therefore placed under tension and held in firm engagement with the lower film. When the films pass upon the leading side of the spool 42 the upper film 95 passes upwardly and extends about the spool 91 to the right and this film 95 then leads to the reel 105 and is wound thereon. The lower film 58 when passing beneath the opening 77 is exposed and when passing upon the leading side of the spool 42 it extends over the spool 43 and then over the various spools and into and through the tanks 110, 111 and 112 in succession and finally passes out of the casing and about the spool 50 and then about spool 98 and 103 and is discharged to the washing tank.

During this operation, the circuits for the heating coil 114 and motor 115 are open, while the circuits for the motor 109 and light 86 are closed.

If it is desired to make a copy upon a short film, the short unexposed film 58' is paid out from a cartridge 59' held by the spring pins 68. When this is done, the case 59 may be separated from the cover 24 and the opening 68' covered by the slide 72'. The film 58' is then handled in the same manner as described in connection with the film 58.

The apparatus may also be used to develop a previously exposed film. When this is to be done, the slide 82 is shifted to the closed position, and the case 59 is connected with the cover 24. The exposed film in a light-tight reel is introduced into the light-tight case 59 and the cover 60 applied to the same. This film is passed about the several spools, in the same manner as indicated by the film 58, and the film travels through the tanks 110, 111 and 112, and is finally led to the washing tank. This film is a previously exposed negative film.

When the apparatus is used for drying the film, the bracket 61 is separated from the base 20 and cover 24, and this separates the case 59 from the cover. The opening 68' is now uncovered and the wet film may be paid out from the washing tank and will pass through the opening 68' and about the several spools. The slide 23 is now shifted to the open position. The film 58 will be passed about the spool 103 and led to the reel 105 to be rewound thereon. The circuit for the motor 109 is closed, and the circuit for the heating coil 114 is closed, and the circuit for the motor 115 is closed, while the circuit for the lamp 86 is opened. The tanks 110, 111, and 112 have been removed. The cover 24 is applied to the case 21 and the film 58 will be supported and guided through the case by the spools. The fan 116 blows the air through the heating coil 114 and the heated air is applied to the wet film 58 to dry the same. The film is dried before it leaves the casing 21. When the apparatus is used to dry the film, the light box 85 is separated from the cover and the slide 82 moved to the closed position.

In the manipulation of the films, leads are first attached to the free ends of the film, and these leads passed about the spools. Since the spools are all carried by the cover, the cover may be removed and ready access had to the spools so that the leads may be passed about the same. When the cover is returned to the closed position, the leads are fed forwardly and the films paid out.

The tanks 110, 111 and 112 are shown for developing an exposed negative film, but when the apparatus is used to develop a positive film the number of tanks may be increased.

Having thus described the invention, what I claim is:

1. In photographic apparatus, a casing having its top open, means for forming separate receptacles in the casing for holding chemical solutions, a cover removably mounted upon the top of the casing, spaced supports disposed inwardly of the cover and attached thereto and generally vertically arranged to enter the receptacles when the cover is applied to the casing, lower film-guide devices mounted upon the supports, upper film-guide devices disposed inwardly of the cover, a light-tight container disposed exteriorly of the cover and attached thereto and removable as a unit with the cover, a tubular connection between the interior of the container and the interior of the cover for the passage of the film from the container to the film-guide devices, said tubular connection passing through the cover above the casing, the cover having a film-outlet means associated therewith.

2. In a photographic apparatus, a casing, means forming receptacles within the casing for holding chemical solutions, a cover removably mounted upon the casing and having a light-tight joint with the same, spaced supports disposed upon the inner side of the cover and attached thereto and arranged to enter the receptacles, lower film-guide devices mounted upon the supports, upper film-guide devices disposed inwardly of the cover, a copying spool disposed inwardly of the cover and carried thereby, said cover having a bridge adjacent to the copying spool and slots upon opposite sides of the copying spool and a light passage extending through the bridge, film-guide devices disposed near and upon opposite sides of the copying spool, a light-box mounted upon the cover to supply light to the passage, and film-guide devices arranged exteriorly of the cover and near the slots, said slots having means to form a light-tight joint with the film passing through the same.

3. In photographic apparatus, a casing means forming receptacles within the casing for holding chemical solutions, the casing having its top open, a removable cover for the casing to render it light-tight, spaced supports disposed upon the inner side of the cover and attached thereto and arranged to enter the receptacles, lower film-guide devices mounted upon the supports, upper film-guide devices disposed inwardly of the cover, a copying spool disposed inwardly of the cover and carried thereby, said cover having a bridge extending over the copying spool, said cover having a light passage extending through the bridge to the copying spool and also having slots disposed upon opposite sides of the light passage, means to guide the film about the upper portion of the copying spool, means for forming light-joint joints between the film and the bridge upon opposite sides of the passage, means for forming light-joints with the film passing through the slots, film-guide devices arranged exteriorly of the cover and near the slots, a light-box having means to supply light to the light passage, and means to advance the film to be copied and the film to be developed.

4. In photographic apparatus, a casing, means forming receptacle within the casing for holding chemical solutions, a removable cover for the casing to render it light-tight, spaced supports disposed upon the inner side of the cover and attached thereto and arranged to enter the receptacles, lower film-guide devices mounted upon the supports, upper film-guide devices disposed inwardly of the cover, a copying spool disposed inwardly of the cover and carried thereby, said cover having a bridge extending over the copying spool, the bridge having a light passage and the cover having slots upon opposite sides of the light passage, means to guide the film about the upper portion of the copying spool and carried by the cover, means forming light-tight joints with the film upon opposite sides of the light passage, means for forming light-tight joints with the film passing through the slots, a light-box arranged exteriorly of the cover and mounted thereon to supply light to the passage, film-guide devices mounted upon the light-box and arranged near the slots for coaction with the film-guiding means, means for paying out the unexposed film to the guide means and copying spool, means to pay out the film to be copied to the last-named film-guide devices and film guide means, and means to advance the films.

5. In photographic apparatus, a casing, means forming receptacles within the casing for holding chemical solutions, a removable cover for the casing to render it light-tight, film-guiding and copying means disposed upon the inner side of the cover and carried thereby, said cover having a light passage leading to said means and slots for the passage of the film to be copied, means to supply light to the passage, means for holding an unexposed film and to feed the same to the guiding and copying means, means for holding a film to be copied and to feed the same to the film-guiding and copying means, the first-named film holding means and the second-named film holding means being mounted upon the cover and removable therewith as a unit, film-guiding devices disposed upon the inner side of the cover and carried thereby for receiving the first named film from the film-guiding and copying means and to introduce the same into the receptacles, and means to advance the films.

6. In photographic apparatus, a casing, removable receptacles within the casing for holding chemical solutions, a cover for the casing, film-guiding and copying means disposed upon the inner side of the cover and carried thereby, means to supply light to said means, means for holding an unexposed film and to feed the same to said means, means for holding a film to be copied and to feed the same to the film-guiding and copying means, film-guide devices disposed upon the inner side of the cover and carried thereby and receiving the first-named film and introducing the same into the receptacles, a pivoted support arranged exteriorly of the casing, a take-up spool mounted upon the pivoted support for engagement with the first-named film, a gear connected with the take-up spool to turn it, a gear arranged to be engaged by the first-named gear, a motor to drive the second-named gear, a second take up spool for connection with the second-named film, and driving means between the first-named and second-named take-up spools.

7. In apparatus for exposing and developing films, a base, a plurality of receptacles mounted upon the base, a cover common to all receptacles, film guiding and copying means arranged beneath the cover and mounted thereon, a source of light associated with the film guiding and copying means, a bracket connected with the cover and removable with the cover as a unit, means for attaching the bracket to the base, means mounted upon the bracket for holding an unexposed film and paying the same out to the film guiding and copying means, means mounted upon the bracket for holding a film to be copied to pay the same out to the film guiding and copying means, film guide devices arranged within the receptacles and mounted upon the cover and removable with the cover as a unit, means to separate the films, the first-named film passing about the film guiding devices in the receptacles, and means to advance the films.

8. In apparatus for exposing and developing films, a support, a rotatable copying spool having a continuous periphery and means to prevent a film from slipping thereon, guide spools disposed near and upon opposite sides of the copying spool, means for holding an unexposed film and paying the same out to the guide spools and copying spool, the film passing beneath the guide spools and over the copying spool, means for holding a film to be copied and paying the same out to the guide spools, the second-named film passing beneath the guide spools and between the guide spools and the first-named film and over that portion of the first-named film extending over the copying spool, means for supplying light to the superposed portions of the films, means to separate the films, means to advance the first-named film, a take-up spool connected with the second-named film, a driving pulley, a driven pulley connected with the take-up spool, and an elastic endless belt passed about the pulleys.

9. In apparatus for exposing and developing films, a receptacle for forming a chamber, a rotatable copying spool arranged within the chamber, guide spools disposed near and upon opposite sides of the copying spool, a bridge extending across the copying spool and having a light passage, said receptacle having film receiving passages disposed upon opposite sides of the light passage and arranged near the guide spools, a stationary guide plate secured to the receptacle and spaced therefrom and having an opening in substantial alignment with the light passage, webs carried by the guide plate, a light box having a lower portion arranged between and held by the webs and having an opening in its end in communication with the opening of the guide plate, means for holding an unexposed film and to pay the same out to the copying spool and guide spools, means to hold the film to be copied and to pay the same out to the guide spools and copying spool, the second named film passing through the film receiving passages, a slide arranged upon the inner side of the guide plate, said slide having an intermediate opening for coaction with the light passage and outer openings disposed upon opposite sides of the intermediate opening, said outer openings receiving the film to be copied, and means to advance the films.

10. In apparatus for exposing and developing film, a receptacle for forming a chamber, a rotatable copying spool arranged within the chamber, guide spools disposed near and upon opposite sides of the copying spool, a bridge extending across the copying spool and having a light passage, said receptacle having outer passages disposed upon opposite sides of the light passage and arranged near the guide spools, a stationary guide plate secured to the receptacle and spaced therefrom and having an opening in substantial alignment with the light passage, resilient webs carried by the guide plate, a light box having an end portion arranged between and detachably held in place by the resilient webs, film guide means arranged exteriorly of the chamber and mounted upon the light box, means for holding an unexposed film and to pay the same out to the copying spool and guide spools, means to hold a film to be copied and to pay the same out to the film guide means, guide spools, and copying spool, the film to be copied passing through the outer passages, a slide arranged upon the inner side of the guide plate, said slide having an intermediate opening for coaction with the light passage and outer openings disposed upon opposite sides of the intermediate opening, the outer openings receiving the film to be copied, the outer openings having a greater width than the intermediate opening, and means to advance the films.

HENRY KERSHAW.